United States Patent [19]
Kaplan et al.

[11] Patent Number: 5,787,386
[45] Date of Patent: Jul. 28, 1998

[54] COMPACT ENCODING OF MULTI-LINGUAL TRANSLATION DICTIONARIES

[75] Inventors: Ronald M. Kaplan, Palo Alto, Calif.; Atty T. Mullins, Tucson, Ariz.

[73] Assignee: Xerox Corporation, Stamford, Conn.

[21] Appl. No.: 657,229

[22] Filed: Jun. 3, 1996

Related U.S. Application Data

[62] Division of Ser. No. 435,242, May 5, 1995, Pat. No. 5,523,946, which is a continuation of Ser. No. 836,038, Feb. 11, 1992, abandoned.

[51] Int. Cl.⁶ .............................. G06F 17/28; G06F 17/30
[52] U.S. Cl. .................... 704/8; 704/2; 704/9; 704/10; 707/101; 707/102; 707/5; 707/532; 707/536
[58] Field of Search ............................... 704/10, 8, 1, 2, 704/3, 4, 5, 6, 7; 395/794, 601, 611, 612, 613, 615; 707/532, 536, 101, 102, 4

[56] References Cited

U.S. PATENT DOCUMENTS

| | | | |
|---|---|---|---|
| 4,373,192 | 2/1983 | Yanagiuchi et al. | 395/756 |
| 4,460,973 | 7/1984 | Tanimoto et al. | 395/756 |
| 4,468,756 | 8/1984 | Chan | 395/754 |
| 4,471,459 | 9/1984 | Dickinson et al. | 395/795 |
| 4,502,128 | 2/1985 | Okajima et al. | 395/759 |
| 4,551,818 | 11/1985 | Sado et al. | 395/757 |
| 4,584,667 | 4/1986 | Hashimoto et al. | 395/757 |
| 4,623,985 | 11/1986 | Morimoto et al. | 395/752 |
| 4,635,199 | 1/1987 | Muraki | 395/752 |
| 4,641,264 | 2/1987 | Nitta et al. | 395/754 |
| 4,644,492 | 2/1987 | Murata | 395/753 |
| 4,654,798 | 3/1987 | Taki et al. | 395/757 |
| 4,685,060 | 8/1987 | Yamano et al. | 395/754 |
| 4,706,212 | 11/1987 | Toma | 395/752 |
| 4,742,481 | 5/1988 | Yoshimura | 395/760 |
| 4,758,977 | 7/1988 | Morimoto et al. | 395/753 |
| 4,771,385 | 9/1988 | Egami et al. | 395/794 |
| 4,791,587 | 12/1988 | Doi | 395/752 |
| 4,799,188 | 1/1989 | Yoshimura | 395/795 |
| 4,862,408 | 8/1989 | Zamora | 395/613 |
| 4,864,502 | 9/1989 | Kucera et al. | 395/759 |
| 4,864,503 | 9/1989 | Tolin | 395/752 |

(List continued on next page.)

OTHER PUBLICATIONS

EPO399533A2 to Joshiba. Machine Translation System And Method of Machine Translation.
EPO410449A2 to Junich A Dictionary Apparatus Which Stores Entries And Dictionary Information.
"Word-based Text Compression" Moffat, Software-Practice and Experience, vol. 19(2), 185-198 (Feb. 1989).

Primary Examiner—David R. Hudspeth
Assistant Examiner—Joseph Thomas
Attorney, Agent, or Firm—Fay, Sharpe, Beall, Fagan, Minnich & McKee

[57] ABSTRACT

A computerized multilingual translation dictionary includes a set of word and phrases for each of the languages it contains, plus a mapping that indicates for each word or phrase in one language what the corresponding translations in the other languages are. The set of words and phrases for each language are divided up among corresponding concept groups based on an abstract pivot language. The words and phrases are encoded as token numbers assigned by a word-number mapper laid out in sequence that can be searched fairly rapidly with a simple linear scan. The complex associations of words and phrases to particular pivot language senses are represented by including a list of pivot-language sense numbers with each word or phrase. The preferred coding of these sense numbers is by means of a bit vector for each word, where each bit corresponds to a particular pivot element in the abstract language, and the bit is ON if the given word is a translation of that pivot element. Then, to determine whether a word in language 1 translates to a word in language 2 only requires a bit-wise intersection of their associated bit-vectors. Each word or phrase is prefixed by its bit-vector token number, so the bit-vector tokens do double duty: they also act as separators between the tokens of one phrase and those of another. A pseudo-Huffman compression scheme is used to reduce the size of the token stream. Because of the frequency skew for the bit-vector tokens, this produces a very compact encoding.

18 Claims, 10 Drawing Sheets

U.S. PATENT DOCUMENTS

| | | | |
|---|---|---|---|
| 4,870,402 | 9/1989 | DeLuca et al. | 340/825.44 |
| 4,870,610 | 9/1989 | Belfer | 395/752 |
| 4,882,681 | 11/1989 | Brotz | 395/753 |
| 4,890,230 | 12/1989 | Tanoshima et al. | 395/753 |
| 4,912,671 | 3/1990 | Ishida | 395/753 |
| 5,020,021 | 5/1991 | Kaji et al. | 395/755 |
| 5,023,786 | 6/1991 | Kugimiya et al. | 395/754 |
| 5,523,946 | 6/1996 | Kaplan et al. | 704/2 |

" to have down pat, be an expert "

```
       ⌐ 55           ⌐ 55
" to " " have " "down" " pat "
" ®, " " be "   " an " " expert "
       ⌊ 55           ⌊ 55
```

FIG. 5b

TOKEN/NUMBER MAPPER

| TOKEN | NUMBER |
|---|---|
| "to" | 1991 |
| "have" | 872 |
| "down" | 501 |
| "pat" | 18005 |
| "®," | 17 |
| "be" | 427 |
| "an" | 95 |
| "expert" | 2407 |

FIG. 6a

| 1991 | 872 | 501 | 18005 | 17 | 427 | 95 | 2407 |

FIG. 6b

TRANSLATION VECTOR / NUMBER TABLE

| TRANSLATION VECTOR | NUMBER |
|---|---|
| 1/5/7 | 0 |
| 2/4/6 | 1 |
| 4/9/10 | 2 |
| 3/5 | 3 |
| 8 | 4 |
| ⋮ | ⋮ |
| 2/5/9 | T-1 (500) |

FIG. 7

| TRANSLATION VECTOR INDICATOR | 5-BYTE TRANSLATION VECTOR | | | | |
|---|---|---|---|---|---|
| 0 | (_) | (_) | (_) | (_) | (_) |
| 1 | (_) | (_) | (_) | (_) | (_) |
| 2 | | | | | |
| 3 | | | | | |
| ⋮ | | | | | |
| T-1 (500) | (_) | (_) | (_) | (_) | (_) |

TRANSLATION VECTOR INDICATOR / BIT TRANSLATION VECTOR / TABLE

FIG. 8

START

61    SCAN SOURCE LANGUAGE FILE FOR ALL WORDS/PHRASES IN ALL CONCEPT GROUPS, TOKENIZE EACH AND STORE AS FILE

62    COLLECT LIST OF N UNIQUE TOKENS AND MAP TO NUMBER 0 .. (N-1)

65    SCAN TOKENIZED WORD/PHRASES FILE AND REPLACE TOKENS WITH TOKEN NUMBERS AND STORE FOR EACH WORD/PHRASE IN FILE

68    SCAN INPUT FILE FOR TRANSLATION VECTORS FOR EACH WORD/PHRASE AND CONSTRUCT TABLE MAPPING TRANSLATION VECTORS TO SET OF NUMBERS T.

| | |
|---|---|
| 72 | SCAN INPUT FILE AND REPLACE EACH TRANSLATION VECTOR (t) WITH COMPUTED TRANSLATION VECTOR INDICATOR TO FORM NEW RECODED DATABASE AS SEQUENCE OF NUMBERS |
| 75 | SCAN RECODED DATABASE, DETERMINE FREQUENCY DISTRIBUTION, ENCODE AS 1-BYTE/2-BYTE NUMBER, CREATE HIGH FREQUENCY CODE TABLE |
| 78 | COMPUTE LENGTH OF ENCODED CONCEPT GROUPS AND INSERT AS PREFIX TO CONCEPT GROUPS |
| 79 | CREATE TRANSLATOR FILE USING DEFS FORMAT |
| 80 | REPEAT FOR OTHER LANGUAGES |

END

FIG. 9b

START

| | |
|---|---|
| 90 | USER INPUTS CANDIDATE WORD/PHRASE |
| 91 | TOKENIZE INPUT WORD/PHRASE, SEPARATE OUT KEY TOKENS, CONVERT TO NUMBER(S) |
| 92 | GO TO HIGH-FREQUENCY DECODE TABLE AND GET ENCODED NUMBER |
| 93 | SCAN SOURCE LANGUAGE TRANSLATOR FILE LINEARLY, CONCEPT GROUP BY CONCEPT GROUP, UNTIL FIND MATCH WITH NUMBER |
| 94 | SCAN BACKWARD (AND FORWARD) TO GET TRANSLATION VECTOR INDICATOR AND CONCEPT GROUP |
| 95 | WITH TRANSLATION VECTOR INDICATOR GO TO HIGH-FREQUENCY DECODE TABLE AND GET DECODED NUMBER |

96 USE TABLE 40 TO GET TRANSLATION VECTOR IN BIT FORMAT

97 SKIP TO TARGET TRANSLATOR FILE AND CORRESPONDING CONCEPT GROUP AND DECODE EACH TRANSLATION VECTOR IN CORRESPONDING GROUP INTO ITS ASSOCIATED BIT VECTOR AND LOOK FOR MATCH WITH BIT VECTOR OF SOURCE FILE

98 BY INTERSECT OF EACH DECODED TRANSLATION VECTOR WITH TRANSLATION VECTOR OF CANDIDATE WORD/PHRASE

99 IF INTERSECTION FOUND, OUTPUT ASSOCIATED WORD/PHRASE OF TARGET CONCEPT GROUP

END

FIG. 10b

COMPACT ENCODING OF MULTI-LINGUAL TRANSLATION DICTIONARIES

"This application is a division of application Ser. No. 08/435,242, filed May 5, 1995, now U.S. Pat.No. 8,523,946, which is a continuation of application Ser. No. 07/836,038, filed Feb. 11, 1992, now abandoned."

This invention relates to multi-translating systems for translating words and phrases in one language into the corresponding words or phrases of one or more different languages. In particular, it relates a computerized system of the foregoing type employing a compressed database thereby enabling desk-top, lap-top, and even hand-held computers with modest storage resources to function as a multi-lingual dictionary.

BACKGROUND OF INVENTION

Multi-lingual translation dictionaries are commercially available as hard copy books. Hand-held computerized translators for two languages are also commercially available. The latter is typically implemented with a database containing each word of a first language and its synonym in the second language. Various schemes have been devised for such translators to reduce memory requirements as well as searching time of the databases employed.

Attempts to extend the dictionary to include three, four or more languages, or to include, in addition to words, phrases—since certain language concepts are in the form of, or can only be translated into, a sequence or string of words—have encountered major problems and only limited success. These problems mainly involve the requirement of extremely large databases and/or requiring excessively long search times.

A significant advance in overcoming these problems has been made with the introduction of the notion of the concept group, which bears certain similarities to the cataloging scheme used in a thesaurus. In the concept group approach, all of the words and phrases in the various languages are divided up among the same limited number of concept groups. Hence, translation consists of identifying the concept group for the word or phrase in the source language, and then searching for its synonym in the same concept group of the target language.

Nevertheless, even the use of the correlated concept groups scheme does not assure a sufficiently compact encoding of the correspondences between the words and phrases of the different languages, nor an optimum search time. There are many small RAM-based translation applications, as well as other applications, such as a PC, where the user desires to dedicate relatively little memory storage to obtain a translation capability, or the user, especially in a hand-held machine environment, needs a fast search capability though constrained by limited processor power.

SUMMARY OF THE INVENTION

An object of the invention is a compact encoding of multi-lingual translation dictionaries.

Another object of the invention is a compressed database for a multi-lingual translation dictionary capable of rapid look-up of words.

A further object of the invention is a compact encoding of words and phrases into a compressed database for use in a multi-lingual translation dictionary that allows for rapid look-up.

These and other objects and advantages as will appear hereinafter is achieved by a new scheme for compactly representing the words and phrases in each of several languages in a way that allows for rapid look-up, and then compactly associating with each word or phrase in a source language the set of corresponding translations in each target language.

A feature of our invention is compactly encoding the words themselves, using word-number mapping technology. Another feature is a compact way for storing the translation relation, based on the natural frequency skew that we discovered in a particular bit-vector representation of this relation.

In particular, in our invention, the words and phrases are encoded as token numbers assigned by a word-number mapper. These token numbers can be laid out in sequence and, once the token numbers for an input key word are computed, the sequence can be searched fairly rapidly with a simple linear scan (since only number matching is required without character processing). We also provide a means of separating the tokens that make up a single phrase, so that phrases can be incorporated in the set of words and phrases included in the concept groups.

Further, instead of simply setting up concept groups in parallel across the languages, we define an abstract or pivot language whose concept groups are a refinement of all the distinctions made in any of the given languages. We then can give for each word the list of entries in this pivot concept group that it acceptably translates (or more than one such list to indicate degrees of acceptability). Then a word in a first language translates to a word of a second language if they both are marked as being translations of some particular word in the pivot concept group.

Still further, instead of storing a list of pivot-language indexes, we construct a bit vector for each word, where each bit corresponds to a particular element in the pivot group, and the bit is ON if the given word is a translation of that pivot element. Then, to determine whether a word in the first language translates to a word in the second language, we need only see whether the bit-wise intersection of their associated bit-vectors has at least one bit ON.

Moreover, we have discovered that, even though the bit vectors may be relatively long, there are relatively few different patterns of these vectors. Though there may be some highly refined concept groups, in fact most of the groups have small numbers of entries (say less than 10), and there tend to be relatively few translations per word so that relatively few bits are actually turned ON. Thus, although there are $2^{35}$ possible bit vectors of length 35, we have only observed about 500 distinct vectors in the data we have examined. Moreover, the distribution of these bit-vectors is highly skewed—there are very few that have the 35th bit on, since there are very few concept groups with 35 distinctions. And, there are many occurrences of vectors that have combinations of the first 4 or 5 bits set.

Thus, a further feature of our invention is that, instead of storing the bit vectors attached to the tokens of each word or phrase in the concept-group sequence, we compute a token number for the bit vector, as an index into a table of bit-vectors. We draw these token numbers from a numeric interval distinct from the interval used to assign word-token numbers (we simply bias the bit-vector tokens by the maximum word-token number). This makes it easy to distinguish bit-vectors tokens from word tokens. Then, we prefix each word or phrase by its bit-vector token number, so that the bit-vector tokens do double duty: they also act as separators between the tokens of one phrase and chose of another.

As still a further feature, we use one of several pseudo-Huffman compression schemes to reduce the size of the token stream. Because of the frequency skew for the bit-vector tokens, this produces a very compact encoding. Put another way, a feature of our invention is the recognition that translation correspondences can be encoded by highly refined bit-vectors, and that this seemingly space-wasteful representation has a natural frequency skew that makes it extremely space efficient when compressed in a pseudo-Huffman manner.

The present invention will be better understood from the detailed description given herein below in conjunction with the accompanying drawings, which give by way of illustration only and not by limitation, preferred embodiments in accordance with the present invention.

SUMMARY OF DRAWINGS

In the drawings:

FIG. 4b is a schematic view of the structure of a concept group as shown in FIG. 4a;

FIG. 5a shows a typical phrase meaning knowing;

FIG. 5b shows the phrase of FIG. 5a decomposed into tokens;

FIG. 6a is a schematic view of a token/number mapper showing the phrase of FIG. 5a;

FIG. 6b shows the phrase of FIG. 5a translated into a sequence of numbers;

FIG. 7 schematically illustrates a translation vector/number mapper or table for use in the invention;

FIG.8 schematically illustrates a translation vector indicator/translation vector (expressed as 5-bytes of bits) table for use in the invention;

FIGS. 9a and 9b are a flow chart illustrating a preferred sequence of steps for constructing a translator file in accordance with the invention;

FIGS. 10a and 10b are a flow chart illustrating a form of program for implementing use of the translator file constructed as shown in FIGS. 9a and 9b.

DETAILED DESCRIPTION OF PREFERRED EMBODIMENTS

Figure 1:
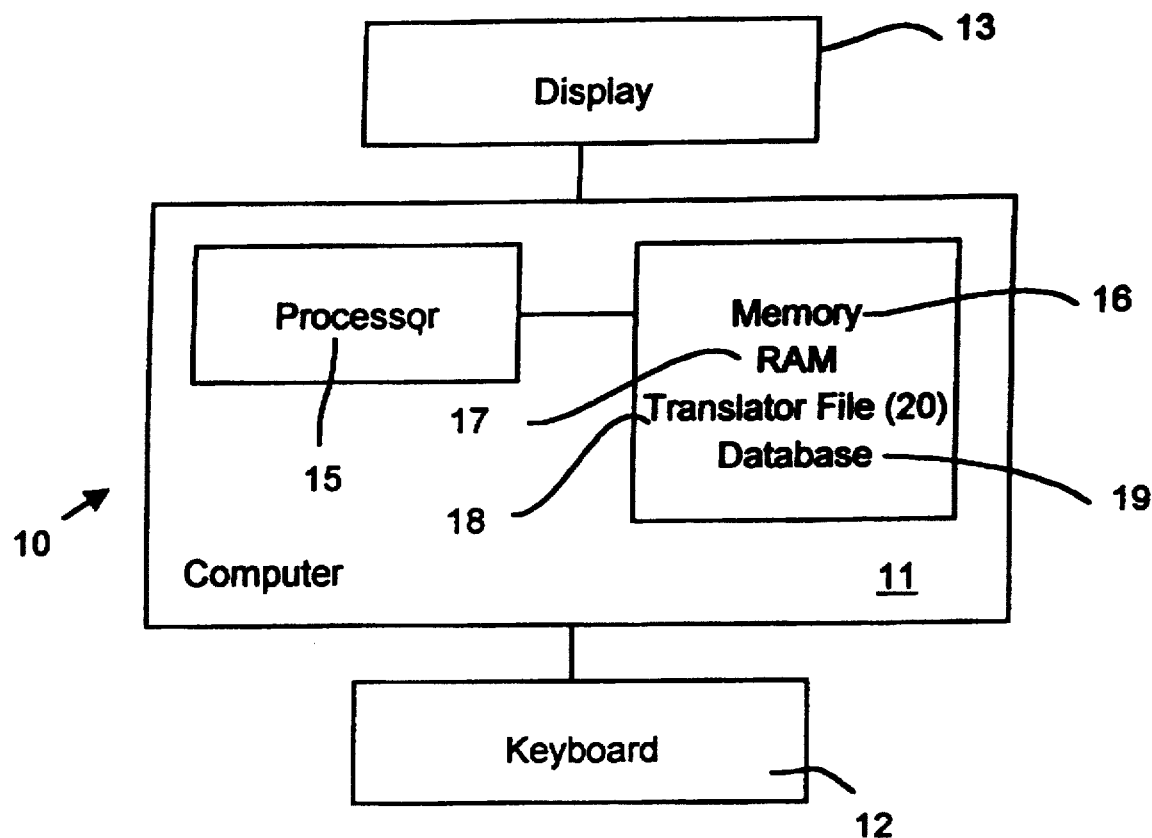
FIG. 1 is a schematic block diagram of one form of multitranslating system in accordance with the invention.

The definitions following below will be helpful in understanding the description that follows as well as the claims:

"Word" is used in its ordinary sense to mean a single string of non-separated alphanumeric characters representative of one or more senses in a language;

"Phrase" means a string of words separated by separators, such as blank spaces, or punctuation, such as commas, hyphens, etc.;

"Language" is used in its ordinary sense to mean a collection of words and phrases, such as English, Spanish, French, German, etc.;

"Token" usually means a symbol typically requiring less storage space, uniquely representative of an item that would typically require more storage space;

"Mapping" means the association of a first item uniquely with a second item. Typically, all of the first items represent a first collection, and all of the second items represent a second collection. A mapping is readily represented by a look-up table, or by an array in which the indices are the first items and the array contents are the second items.

"High Frequency" is a notion associated with encoding schemes to reduce storage. Items in the collection that occur more frequently—thus with a high frequency—are encoded with a smaller size code than items that occur less frequently. Huffman encoding is an example.

A "word-number" mapper simply maps words or punctuation into numbers, and vice-versa, with the advantage that numbers typically require less storage and are processed more easily than words in a typical computer. Two-directional word-number mappers are well known in the art. A particularly efficient word-number mapper is described in a copending application by one of us, Ser. No. 07/776,909, filed Oct. 16, 1991, the contents of which are hereby incorporated by reference.

"Bit Vector" means, simply, a string of "0" and "1" bits representative of another item.

"Dictionary" means a collection of entries representing words and phrases related in some meaningful manner, such as sense, or as lists of items logically associated with one another. We also use herein the term "concept group" to mean such a dictionary entry.

"Data" means signals that indicate or include information. An item of data can have values, for example, binary or other values. The data can be present in any physical form.

"Data Storage Medium" or "Storage Medium" means a physical medium that stores data, commonly, today, using magnetic or optical means.

A "data processor" or "processor" is any component or system that can process data.

"Memory" is any component or system that can store data, and may include local and remote memory and input/output devices.

A processor "accesses" data in memory by any operation that retrieves or modifies the data, such as by reading or writing a location in memory that includes the data.

"Pseudo-Huffman Encoding" means encoding of a sequence of numbers in which more frequent numbers can be represented by fewer bits than less frequent numbers.

Other definitions will be evident from the description that follows.

It should be mentioned that the words and phrases in each dictionary entry are not strictly synonyms. It is better to think of the database as including related terms within a given single language that can be used to identify likely translations in another language. Thus, for example, arm and leg might be in the database in the same concept group even though they are not strictly synonyms. Similarly, you might find proctologist and nephrologist in the group that lists other kinds of doctors even though those terms are also not synonyms.

A typical system according to the invention would consist of a computer 10 with a console 11, a keyboard 12 for user inputs, and a display 13 for input echoes and outputs. The computer 10, which can range in size from a hand-held unit to a PC or mini-computer, would typically contain a processor 15 and memory 16, usually containing RAM 17 for processing data and ROM or disk storage 18 for storing a database 19. In this case, the database 19 would be a set of translator files 20, each representing a compressed encoded word/phrase dictionary relating an actual language to an abstract language (details will follow).

Figure 2:
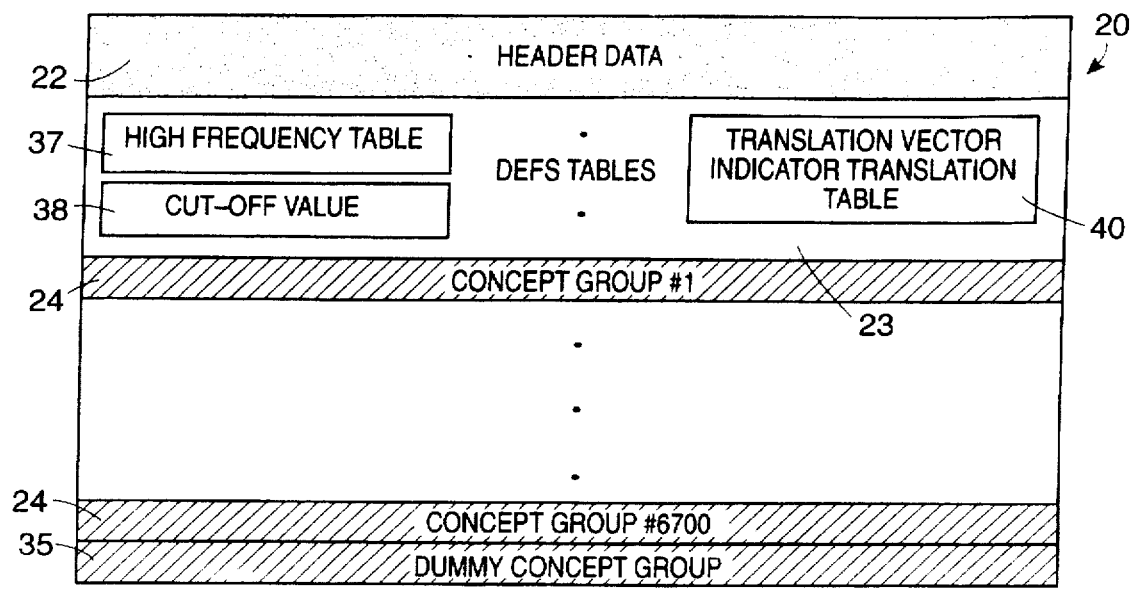
FIG. 2 is a schematic view of the format of one form of a translator file for use in the system of FIG. 1.
Figure 3:
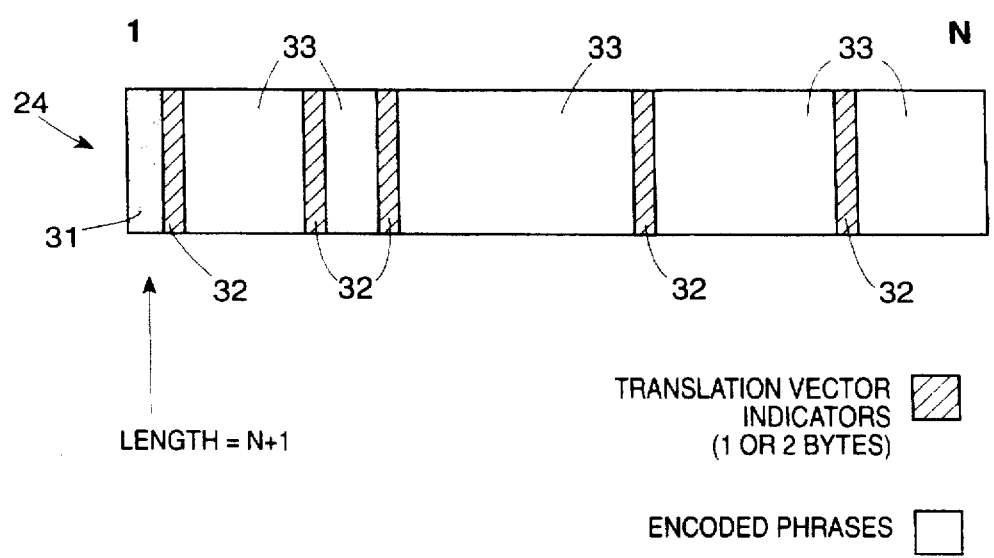
FIG. 3 is a schematic view of the structure of one form of encoded concept group used in the translator file of FIG. 2.

FIG. 2 is an example of a typical translator file 20 made up of a header 22, certain defs tables 23 (explained below), and a set of encoded concept groups 24 corresponding to that of the abstract language. A typical concept group data structure 24 is illustrated in FIG. 3, as is explained below.

Our database 19 contains information that allows mutual translation between two or more distinct languages. For example, a 5-language dictionary would consist of five separate translator files 19, e.g., one file for Dutch, one for English, one for Spanish, one for French and one for German. As one example, which is not meant to be limiting, each translation file 20 may consist of approximately 6,700 concept groups 24. These concept groups are numbered and ordered in parallel from language to language. For example, concept group #8 in English corresponds directly to concept group #8 in Dutch, Spanish, French, and German, and so forth. What this means is that all of the translations for words and phrases in concept group #8 in English are to be found in concept group #8 in all of the other languages. So, an important first level division of our database is into concept groups. Shown below is an example of a concept group covering "knowing" in French, German and English:

| Verb: | | |
|---|---|---|
| 1 savoir | 1 wissen | 1/3 know |
| 2 etre au courant de | 2 bekannt sein mit | 2 know about |
| 3 connaitre | 3 von etwas Kenntnis haben | 4 have (something) down pat |

Thus, a concept group in an individual language consists of a part of speech or category (noun, verb, adjective, etc.) followed by a sequence of lines or phrases (we will move back and forth between those two terminologies). A line or phrase is basically an item that can be translated into another language, and includes words as well as phrases. For example, in the English concept group for the verb "know" there exists the word "know" and also the idiom "have something down pat", each of these on a separate line. If one were looking up the concept group for "chair" which would be in the category noun, one might find things like "stool", "arm chair", "lounge chair", and so forth. So, all of the lines and phrases in a concept group are related to one another. The phrases either specialize the generic term of the concept or are its synonyms or antonyms. If the user specified one of those phrases, it would be helpful for him or her to see the others, possibly to help select the translation that he or she really wants. This is typically the function performed by a thesaurus.

Each line or phrase in the database translates or can be translated by lines or phrases in the corresponding concept group for each of the other languages. For the example given above, "know" in English translates as several different lines in the corresponding group in French; "savoir" is used when one is speaking of knowing a fact, whereas "connaitre" is used when one is speaking of being familiar with a person or a place. Both of those terms correspond to the English word "know", because English does not distinguish between those two kinds of knowledge or familiarity. There has to be some way of indicating that the phrase "know" maps to both terms in French and both terms in French map to the single term in English. German, however, has the same distinction as French. So, the translation from French to German should preserve the distinction of the two different senses.

This kind of correlation between different phrases and lines is handled in the translator file 20 in the following way.

Figure 4A:
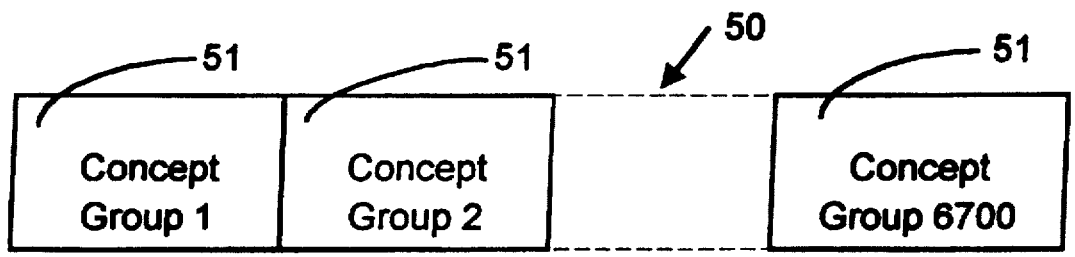
FIG. 4a is a schematic view of a typical input file for constructing the translator file of FIG. 2.
Figure 4B:
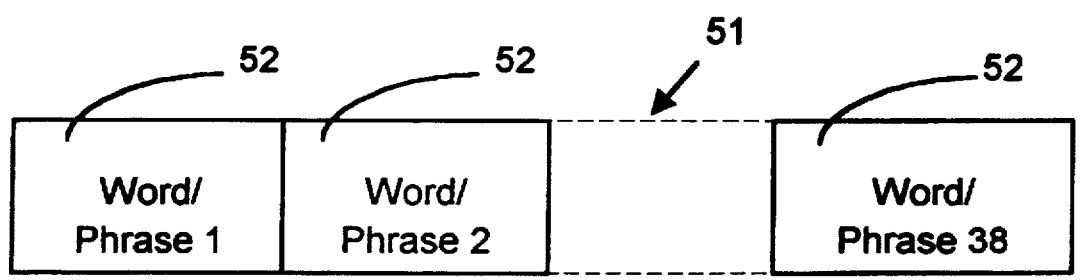
Figure 4C:
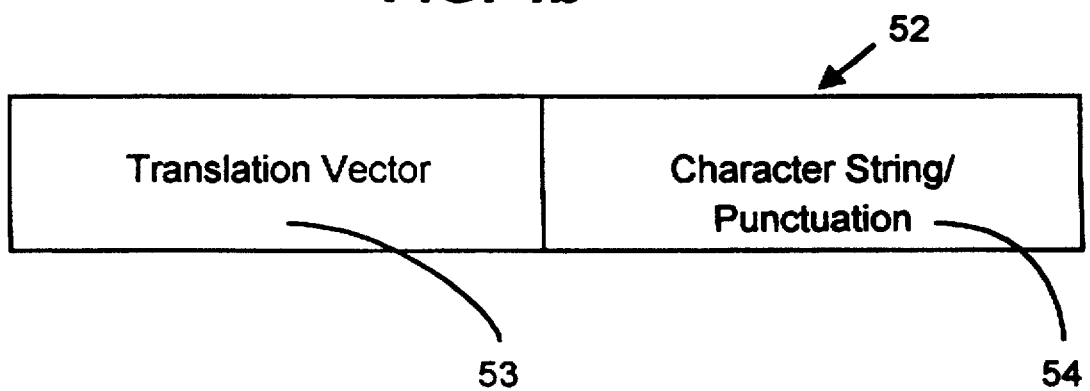
FIG. 4c is a schematic view of a word/phrase item of the concept group of FIG. 4b.

Associated with each line or phrase of a concept group is what we will call a translation vector 53 (FIG. 4c). This is basically a list of numbers, i.e., (1 3 5 16). These numbers are used to identify, in some abstract sense, what the individual meaning of the line or phrase is. To find the translation of a given phrase, note the concept group and the translation vector of each occurrence of the phrase in the source language. Then for each concept group/translation vector pair of the source language, intersect the translation vector with the translation vectors of each phrase in the corresponding concept group in the target language. Each non-empty intersection indicates a valid translation. For example, as indicated by the numbers in the example given above, the English word "know" has the vector (1 3) associated with it. In French, "savoir" has (1) and "connaitre" has (3). In German "wissen" has (1) and "von etwas Kenntnis haben" has (3). Translating "savoir" from French to German, first lookup "savoir" in the French database and note that it is, for example, in concept group 8 and its translation vector is (1). Then go to the German database and consider all of the phrases in concept group 8 and find that "wissen" has (1) and then list it as a translation. Translating "savoir" from French to English, output "know" since it has a translation vector of (1 3) and the intersection is non-empty. Similarly, for translating "connaitre", find (3), go back to English and also find that "know" was marked as having that sense. Thus, the translation vector numbers are basically used in our invention to address senses within a concept group.

Other embellishments as well can be included in the database. For instance, some of the lines and phrases have features attached to them indicating gender. This feature information will add somewhat to the size of the database but does not affect the encoding. They will just be encoded as if they were additional words in the line even though they are never matched against.

Some of the concepts underlying our invention will be better understood from the statistical properties of our database and how they relate to the encoding. As previously mentioned, a preferred database according to our invention can provide roughly 6,700 concept groups. Across concept groups within English, for example, there are about 23,000 different words or lines or phrases that can be translated. There are about 14,000 words in English that make up those phrases including punctuation marks, parenthesis and so forth. It is desirable for the system to translate many more phrases than it actually contains, since one cannot rely on the user literally typing in exactly what was in the database in order to get a match. If the exact phrase were not keyed in there would be very little chance of getting a hit. Hence, it was necessary to devise an encoding system that would allow deviations in the words or punctuation used in a keyed-in phrase to provide an acceptable chance of a match to the target word or expression. For this purpose, we prefer to use a defs encoding scheme, though the invention is not limited to this encoding scheme and others can be substituted.

By "defs encoding" we mean a pseudo-Huffman encoding technique which is optimal for representing sequences of numbers representing words and phrases.

For example, the phrase we mentioned before "have something down pat" can actually be encoded into the database as "have (something) down pat". There is very little chance that the user would think to put the parenthesis around the "something". Indeed, the user might merely type "have down pat" or just "pat".

In our binary encoding scheme, we prefer to use the format defined as defs format deployed in the following way.

Each concept group 24 is represented as a sequence of elements in defs format. The defs format consists of sequence of numbers where each number corresponds to a word or punctuation mark. In addition, there is a default separator that is to be printed between the words corresponding to the numbers; in this case it would be the space. So what is found in the encoding for each concept group will basically be a sequence of numbers. These numbers represent both the translation vectors 53 that are associated with the phrases and the words that are in the phrases. The concept groups 24 themselves are ordered linearly, one right after the other, in parallel from language to language. (See FIG. 2, which schematically illustrates the overall structure of a translator file 20 in the database). The length of a concept group 24 in this encoding is preferably represented by a one or two-byte number 31 that appears as a prefix before the first number for that group. See FIG. 3, which is a schematic view of an encoded concept group corresponding to one of the concept groups Nos. 1. . . 6700 of FIG. 2. For example, if there are 27 bytes that make up a given concept group, that concept group will be headed by a single byte containing the value 28 (we prefer to add 1 to the actual length to facilitate rapidly skipping to a specific concept group—more below). This would indicate that the next 27 bytes in the file are in defs format.

If, however, the actual length of the concept group is greater than or equal to 255 bytes we prefer to represent it as a two-byte number as follows: the first byte is 0 indicating that we are looking at a two-byte number; this is followed by a byte computed as the actual byte length modulo 254. For example, in the case of a length, N, of 269 bytes the first byte would be 0 and second byte would contain the value 15. In FIG. 3, the dotted section 31 represents the length prefix, the cross-hatched sections 32 are each translation vector indicators (described below) for the encoded words or phrases 33 represented by the blank space immediately following.

Although the defs format represents a series of 2-byte numbers, in fact some of those numbers are encoded as a single byte to reduce storage requirements, and some of them are encoded as two bytes. A high-frequency code table can be provided that tells how to decode the one versus the two-byte numbers. The length code 31 at the beginning of a concept group tells you the number of bytes, not the number of numbers that there are. This is an important distinction for lookup. Lookup begins by scanning each concept group 24 in the source language trying to find a match in a way that is described below. When a match is found in a particular concept group, it becomes necessary to scan for the corresponding concept group in the target language. This can be done rapidly by simply jumping from concept group to concept group in a tight program loop that merely adds the byte length until one counts out the number of the target concept group.

This mechanism allows one to distinguish and separate one concept group from another. However, it is important to establish the boundaries between the bytes that make up one phrase and the bytes that make up another, and also how to find the translation vector for each phrase. This is done in the following preferred way. The numbers that make up each word or phrase are actually divided into two classes. These two classes are distinguished by the magnitude of the number after it has been decoded through the previously mentioned high-frequency table. A word-number mapper encodes a set of words as a set of numbers in a given range (0 to the number of words minus 1). We will call the extent of the range the cutoff. For a given encoded phrase, all the numbers below the cutoff correspond to the words to be looked up in the word-number mapper and all the numbers equal to or above the cutoff denote translation vector indicators directly (explained below). Each phrase is headed by a number that denotes its translation vector, and in fact the way in which one phrase is broken apart from its surrounding phrases is by noting where the translation vector indicators appear, as illustrated in FIG. 3.

To summarize, a concept group 24 comprises, first, a one or two-byte header 31 that gives its length. The next one or two-bytes, depending on the high frequency decode, will be the translation vector indicator 32 (which also may be viewed as a pointer into the translation vector table) for the first phrase. Then there will be a sequence of bytes encoding numbers that make up the first phrase 33 followed by a byte or bytes encoding the translation vector indicator 32 for the next phrase, and so on.

After the last concept group, we provide a dummy concept group 35 with a one-byte length of 255. The way one determines that the end of the file has been reached is to determine whether the first (and only) byte that encodes the length of the concept group is 255. Note that this is distinct from the case where the actual length of the concept group is 255 which would be encoded as a two-byte sequence of 0 followed by 1. The reason for not using one (which indicates an empty concept group of length zero) instead of 255 is that a concept group could conceivably have a length of zero. If, for example, there is a concept group with translations in three languages but there was no convenient translation in a fourth language, in the fourth language there would be a place holder for that concept group to keep the sequence of concept groups correct. But, that place holder might have a length of zero. There is no marker for the end of the last phrase of a concept group. The way one locates the end of the last phrase of a concept group, in the preferred embodiment of the invention, is to note that the next byte would be the length byte of the very next concept group. So, our preferred translator file 19 employs a double level of separators, the length bytes 31 which separate the concept groups 24, and within the concept groups 24, the translation vector indicators 32, which separate words or phrases 33. The remaining bytes represent the phrases themselves and are to be decoded and looked up in the word-number mapper. Again, the way that you distinguish between the translation vector indicators 32 and the numbers that make up the words in a phrase is to do a quick test comparing the magnitude against the cutoff value.

Briefly summarizing up to this point, there are two data structures that make up the compressed translation file. One is a word-number mapper defined, for example, as described in the copending word-number mapping application. More on this later. The second is a defs file which has the defs file header 22. This has the high frequency list 37 to decode the numbers, another field 38 that contains the cutoff value to distinguish the translation vector indicators from the word indicators, and it has the length bytes that separate the concept groups.

There is a third data structure 40 (see FIG. 8) that comes with the multi-translating system of our invention that is used to decode the translation vector indicators 32. The translation vectors 53 have numbers in them that range from one to 38, by way of example. For example, there may be one or two concept groups that have 38 different senses; they list, for example, different kinds of doctors or different kinds of financial transactions. Recall that what is desired is to intersect these vectors in a very quick way. The encoding that we prefer is to represent these vectors simply as bit strings. So, for the example given above, 38 requires a 5-byte bit vector. In fact, the translation vectors that are stored are simply 5-byte bit vectors. Having obtained two bit vectors, one for each phrase in the two languages, one can determine whether they are mutual translations by simply doing a bitwise logical AND, and if the result is non-zero then they are translations.

We have observed that the frequency distribution of these bit vectors is highly skewed, and that is an important basis for the compression feature of our invention. A bit vector that has bit 1 on, i.e., the bit corresponding to sense one of the concept group, is much more frequent than for example, a bit vector that has bit 38 on, because there are hardly any concept groups that have 38 senses, but every concept group has at least 1 sense. By exploiting that fact, it is possible to obtain a compact encoding of all the bit vectors that occur. Thus, what we have discovered is that, although there may be 23,000 phrases in the English database, scattered among the 7000 or so concept groups, there are in fact only about 500 distinct translation vectors across the concept groups. We collect those distinct translation vectors together to produce a table 40 of roughly 500 5-byte translation vectors. The indicators that are stored in the defs file, both to separate phrases from each other and also to indicate the translation vectors for a phrase, are essentially indices into this 500 by 5 table 40, illustrated in FIG. 8. The translation vector indicator thus serves as a pointer to the sense bit vector in the table 40, which serves all the concept groups.

It will be appreciated from the foregoing description that the relatively limited number of translation vectors representing different sense vectors present in one or more of the different concept groups is a major contributor to the resultant compact, fast-accessing database. This means, of course, that the same translation vector will be repeated in the translator file but in different concept groups. Optimally, the number of concept groups should be chosen such that, with the number of the resulting unique translation vectors and the size of the word/number mapping facility required, when taken together with the concept group data structure, memory requirements are minimized. In general, the number of concept groups will fall in the range of 2–20 thousand, which will produce of the order of hundreds of unique translation vectors. The latter will inevitably produce a skewed distribution because with this range of concept groups covering the standard languages, typically most concept groups will contain, say, 4–8 senses and thus the bit vector representations of the translation vectors will be heavily weighted with small numbers.

An index for the table 40, i.e., the translation vector indicator, is calculated as follows. Get the translation vector number, first by checking to see whether it is a high frequency byte, and if so, going to the high-frequency table 37 to get the two-byte number. Determine that it is above the cutoff 38 so that it is, in fact, a translation vector indicator 32 and a phrase boundary. Take the decoded number and subtract the cutof e value 38 from it to get the index into this 500 by 5 table 40. For example, a number which is equal to the cutoff value would give index number zero and a number that was the cutoff value plus one would give index number one. The skewed frequency distribution, which is a feature of our invention, of these translation vectors is accommodated in this pseudo-Huffman encoding scheme by putting those numbers into the same numbering sequence as the word numbers and using an ordinary high frequency decode table in the defs file. When we come to computing the high frequency table 37 no distinction is made between numbers that are translation vector indicators 32 and numbers 33 that are word indicators. That gives the maximally effective way of utilizing the one-byte and two-byte numbers. In our pseudo-Huffman encoding, a table is built, referred to herein as the high-frequency decode table, of the most frequently occurring sets of numbers, and these are assigned values which can be conveyed with a reduced number of binary digits. The defs encoding has the advantage that the length of a token can be determined quickly by comparing against a single value, as described below, without having to search a separate table as standard Huffman-coding schemes require.

To summarize then, this is the way the translation process is run. (See FIGS. 10a and 10b.) One takes the user's input word and looks it up in the source language index (or start state) to get its number. One scans the source language defs file concept group by concept group in an outer program loop. Within the outer loop one does a defs file scan to find a hit. When one gets a hit, one can identify the phrase or phrases that the hit is in by scanning backward—this is an advantage of our pseudo-Huffman encoding that we can scan backwards—for the immediately preceding translation vector indicator and forward to find the next translation vector indicator or the end of the concept group. One can then decode the translation vector indicator by looking it up in the translation vector table. One now has the concept group number and the translation vector for the phrase (the phrase can be optionally displayed to show what kind of hit one got on the particular word). Having identified the source concept group, the program skips down to the corresponding group in the target language defs file. Now, one can decode each translation vector indicator in the target concept group and intersect the resulting translation vector with the translation vector from the source. If they intersect, output that phrase and then skip to the next phrase within the current concept group to continue the search.

It may also be desirable to display the part of speech for the concept group that has been identified. The part of speech is preferably encoded using the following technique. The concept groups are sorted so that all of the noun concept groups in all the languages come first in corresponding order, then all the verbs, then all the adjectives, and so forth. A simple table is provided that says how many groups of each category there are. There are only about 5 or 6 different parts of speech, so given the group number it is a trivial search to identify the part of speech. There may be some complexity in that the letter or name of the part of speech may vary from language to language. For example, one might enter noun in English, but ask for subst in Spanish. Interface issues should be taken into account, since there are really three languages involved in any of these translation products. There is the native language of the user, then the source language, and the target language, all of which may be distinct. For example, assume a French speaking user who is translating from English to Spanish. In this case, it may be preferred to use the French part of speech indicators instead of the English. This is generally a trivial problem which can be handled in many different ways not important to the present invention.

A more detailed explanation of how a person skilled in the art can construct a suitable compressed database of translator files in accordance with the invention, and how such a database would function, now follows, with reference to the drawings which illustrate the steps to follow and the data structures used or that result.

Assume that an abstract pivot language has been defined. It will be understood that the abstract pivot language is really a theoretical fiction—it isn't something that actually appears on a file, ROM or RAM or has any other realization in the system. The person who makes up the concept group definitions may construct a document that records the sense groups he is thinking of and include specific definitions (perhaps by English sentences or descriptions) to remind him of how he is dividing up the concept space. He might refer to this document in order to make sure that he codes up the right translation vectors from language to language. But once he has created the various translation concept files, that document plays no other role. In particular, it never enters into the computer system; it's only visible reflex is in the numbers that appear in the translation vector.

Assume an input file 50 consisting of a sequence of separated concept groups 51 each of which consists of a sequence of phrases 52 of the source language as shown in FIGS. 4a and 4b. A phrase 52 consists of a translation vector 53 (one or more numbers indicating specific senses in the abstract or "pivot" concept group) and a character string 54 containing the words and punctuation marks that make up that particular phrase shown in FIG. 4c. FIGS. 9a and 9b show a flow chart of the algorithm or sequence of steps to follow.

In the first step 61, pass through all the phrases 52 in all the concept groups 51 of the input file 50 and divide the character strings 54 into tokens 55 (FIG. 5b) at appropriate segmentation points. If desired, the concept groups can be first sorted by part of speech. In particular, we divide the character strings 54 into alternating sequences of alphanumeric and non-alphanumeric substrings 55, throwing away the space character whenever it appears as the only separator between words. Thus, the string "to have down pat, be an expert" (Fig. 5a)

would be divided (step 61) into the following tokens (FIG. 5b), each surrounded by double quotes:

"to" "have" "down" "pat" "ⓧ," "be" "an" "expert".

This is accomplished according to the principle that a single space (the default separator) is assumed to exist between every pair of tokens unless such a space is specifically canceled by the special mark ⓧ (the no-space or cancel-default-separator mark). Thus, the comma-space sequence between "pat" and "be" is represented by the token "ⓧ," instead of simply ",". The latter would appear in the segmentation of "pat , be", where a space also precedes the comma.

A list of unique tokens is then collected (step 62) from this set of segmented strings. This list will contain one instance of every token no matter how many times it appears across the different phrases and concept groups. Let N (about 20,000 in one example database) be the number of such unique tokens. Then, a word-number mapper 64 (FIG. 6a) is constructed that associates a unique number 56 between 0 and N-1 to each of the unique tokens; 55. The order of numbering can be arbitrarily chosen to improve performance by the mapper. The essential requirement is that the resulting mapping data structure 64 be able to quickly convert between a given number in that interval to the corresponding character string, and inversely, also between a character string and the corresponding number.

The next step 65 is then to pass through the tokenized phrases again, this time replacing each token by the number that has been assigned to it by the mapper 64. Suppose, in our example, that the numbers are assigned as follows:

| 1,991 | "to" |
| 872 | "have" |
| 501 | "down" |
| 18,005 | "pat" |
| 17 | "ⓧ," |
| 427 | "be" |
| 95 | "an" |
| 2,407 | "expert" |

Then the character string of this phrase would be recoded to the sequence 66 (FIG. 6b) of numbers 1991 872 501 18005 17 427 95 2407 and, given that the word-number mapping is invertible, this sequence 66 of numbers contains all the information needed to accurately recreate the original string 54.

Having converted the character string part of a phrase into a sequence 66 of numbers, we now turn to the translation vector part. A translation vector 57, as explained, is a set of numbers that indicates which senses of a concept group a particular word or phrase can be used to express. For example, the vector 1/5/7 would indicate that the phrase that it is attached to expresses any of the senses 1, 5, and 7 of a particular abstract concept group, and therefore its translations in another language include any words or phrases that have any of those sense numbers in the corresponding concept group.

To process the translation vectors, we pass again 68 through all the phrases 52 in the input file 50, this time picking out the translation vectors 53 that are associated with each word or phrase in each concept group. We observe that there are relatively few unique translation vectors 57, and that the frequency distribution is highly skewed (translation vectors with small numbers (1,2,3) are much more common than ones with large numbers (37, 38), just because there are relatively few abstract concept groups with large numbers of senses.

Let T be the number of unique translation vectors (in our database example, T was about 500). We arbitrarily number 58 the translation vectors from 0 to T-1, and build a simple data structure 70 (FIG. 7) (an array of T elements) that allows a translation vector to be retrieved, given an associated number. The translation vectors themselves could be represented in this array by a list of numbers, but we choose to use fixed-length bit vectors (FIG. 8) (5 bytes if the largest abstract concept group has between 33 and 40 senses) to represent the translation vectors. This makes it fast to determine whether two translation vectors have any elements in common: we just take the logical AND of the bit vectors and test whether the result has any "1" bits. The mapping of the translation vector indicators 32 to the fixedlength bit vector representations of the translation vectors 53, as previously described, is stored in a table 40 (FIG. 8) indexed by the translation vector indicator number representation.

We next 72 make a pass through the previously created word-number concept groups 66 in the translation file we are building and replace each translation vector with a "translationvector indicator". This is a number computed from the number assigned to be the translation vector (between 0 and T-1) and the total number of words (N) in the language. If this is a translation vector number, then the indicator for that vector in our preferred embodiment is N+t (recall that the last word number was N-1). The result is a recoding of the concept translator database for this language where each concept group now consists of a sequence of numbers which can be divided by inspection (i.e., seeing whether the number is or is not below N) into numbers denoting words and numbers denoting translation vectors. Given this easy separation scheme and given the fact that every phrase has an associated translation vector, we need no other special marking to distinguish where the numbers of one phrase in a concept group ends and another phrase begins.

Next, we compute 75 the frequencies of the numbers across the entire recoded concept database, and assign smaller codes (1-byte) to numbers with the highest frequencies and larger codes (2-bytes) to those with lower frequencies (33 in FIG. 3) and assign the results for future decoding purposes to an appropriate data structure or decoding routine. One suitable form of data structure is a simple high frequency code table, which maps any of the compressed and encoded numbers in the recoded translation file into its actual number representative of its translation vector indicator or, eventually after more decoding, into the desired word or phrase. The table itself is stored 37 in the resultant translator file (see FIG. 2).

One way to arrange for the allocation of high-frequency codes is to note that if N+T is significantly less than 65,535, the largest number that can be encoded in two bytes, a large number of possible byte values will not be used as the high-order byte in the representation of any number. Specifically, 255-(N+T-1)/256 high-order byte values will not occur in any number, and these can be used as unambiguous 1-byte indicators of high-frequency items. If (N+T-1)/256 is subtracted from a byte and the difference is positive, that byte is interpreted as a 1-byte high-frequency code, and that difference can be used directly to index into the simple high-frequency decode table.

Any of the known compression schemes of the Huffman type can be used for this purpose but we prefer the pseudo-Huffman coding previously described.

When this recoding is done, we can then compute 78 (FIG. 9b) the length of each concept group, to be stored as a separate (one or two) byte quantity. This length is stored as a prefix 31 (FIG. 3) on the concept group, to permit a fast program loop that skips down to a concept group with a particular number.

Finally, we complete a source language translator file 20 by formatting 79 into the defs format.

This complete procedure is carried out independently for every language 80. The only consistency requirement between languages is that its concept groups must be ordered in the same way in every language: the nth concept group in language i must correspond to the nth concept group in language j.

The way in which the resultant translation file is used by a user has been described above, and is summarized in Figs. 10a and 10b, which is a flow chart of one form of algorithm or sequence of steps 90–99 that can be executed in order to provide the user with a translation in a target language for a word or phrase in a source language inputted by a user.

This process uses the translator files of FIG. 2 for both the source and target languages, each of which includes its high-frequency code table 37, the cut-off value 38, and the translation vector indicator to translation vector table 40 (FIG. 8). The calculation for the index of the latter table 40 has been described above.

The rules for determining when there is a match can vary. For example, the word "get" in English might have its own definition and translation, but might also be used in lots of other phrases, i.e., "get a job". The word "have" is another example. On one hand one might want to know that it translates to the French word "avoir", but it is also used in all sorts of idioms, "have something down pat" being one of them. When the user types in "have" and asks for translations, the system would want to get, "avoir", the translation for that particular word, and not translations for all the phrases that include it. Similarly for "of", "the" and so forth. They ought to have literal translations, and not match all the phrases in which they appear. One suitable strategy is to assume that one is seeking maximal coverage on a search for a given word. That is, take the maximal match first. Only if that fails should weaker matches be supplied. Because there is a term for "have" in the database, say, that will be outputted first and the user would have to push some key to get other matches.

It will be further understood from the foregoing explanation that a word or phrase can be present in one or more than one concept group, if the same word or phrase has several meanings crossing concept group boundaries. When such a word or phrase is inputted, the system of the invention will score a hit in each of the concept groups that the corresponding word or phrase is present, and thus each of those found translations will be reported to the user.

It is worth describing in slightly more detail the different techniques that can be used to do the defs file matching. The most straight-forward way of doing the search is to take the number that one is searching for and store it in a register as a two-byte number. Then scan the file from byte to byte, examining each byte to see whether it is a one-byte encoding of a high-frequency number or else is the high-order byte of a two-byte number. If it is a one-byte encoding, obtain the corresponding true number from the high-frequency table and compare it with the stored number to determine if there is a hit. If it is the high-order byte of a two-byte number, compare the stored number with the number created by combining that byte with the next byte in the file. This requires that one actually decodes and accesses the high frequency decode table on every number and therefore is presumably slow.

A faster search would be to take the input number and determine whether it is high frequency or not by searching the high frequency table. If it is high frequency, figure out what the one-byte code that represents it is and search for that, keeping the parity of the bytes as one proceeds. So, for each number that one comes to, one determines whether it's a one-byte or two-byte number. If it's a one-byte number and one is looking for a one-byte number, try to match literally; if it's a two-byte number and one is looking for a two-byte number, again try to match literally; otherwise skip. One never has to access the high frequency decode table to find out what the true number is. This only needs to be done once when looking for the input word. That's faster and of no more complexity. It does require keeping track of the parity while searching. A minor cost, but a cost that can be avoided.

The fastest search scheme is the following: determine whether one is looking for a one-byte or a two-byte number. If it's a one-byte number, figure out what the high frequency code is going to be and search for it. If it's a two-byte number, search for its high order byte. Ignoring the parity, you would go byte by byte down the defs file looking for a hit on that byte. The theory here is that one hardly ever gets a hit, so one wants to put more into the code that executes when one gets a hit and less work into the scanning code. When one gets a hit, that is, the bytes match, one actually doesn't know for sure that the word one was looking for is found. It can be wrong in at least two ways: if one were looking for a one-byte number, one may get a match on the low-order byte of some two-byte number, or if one were looking for the high order byte of a two-byte number, one may also match on the low order byte of a two-byte number.

Both of these difficulties come from the fact that track has not been kept of the parity of one and two-byte numbers while going along. When one gets the high order byte match for a two-byte number, one immediately looks and sees whether the low order byte matches the next byte in the token stream. If they match it's a further suggestion that one has a hit. But, it still could be wrong. It could be the case that one has matched the high order byte against the low order byte of some two-byte number and the low order byte against the first byte of the next token. Accordingly, when one does get a hit on a byte, and in the two-byte case one can confirm that the next byte matches also, one has to re-establish the parity. One obvious way of doing that is to say a hit has been scored in this concept group in our fast scan, so let's start at the beginning of the concept group again doing a slower scan to confirm the hit. That means that one can run a slow algorithm only when one receives suggestions from the fast algorithm that a hit was scored.

Another technique is to actually scan backward a small distance from the location that a hit was scored in order to re-establish the parity. This works as follows: One knows that a hit was scored at a given byte position. One scans backward looking for the immediately preceding one-byte number. If there are an even number of bytes between where the match occurred and where the preceding one-byte number is, then one knows that the parity is right. This is because the preceding one-byte code is either a true one-byte code or the low order byte of a two-byte code. In either case, a token-break occurs immediately after it, and since it was the immediately preceding one-byte code, there can only be two-byte numbers (i.e. an even number of bytes) between it and the match point if the parity of the match point is correct.

One does not have to scan very far back, because, by definition, one-byte numbers are high frequency. Instead of scanning forward from the beginning of a concept group, one needs; merely to scan backward a short distance from where one is to re-establish the parity and thus determine whether or not the hit is in fact a real match. This strategy of scanning backward is not crucial to the invention because the concept groups are relatively small and there is an absolute beginning to scan forward from.

While the invention has been described and illustrated in connection with preferred embodiments, many variations and modifications as will be evident to those skilled in this art may be made therein without departing from the spirit of the invention, and the invention as set forth in the appended claims is thus not to be limited to the precise details of construction set forth above as such variations and modifications are intended to be included within the scope of the appended claims.

What is claimed is:

1. A method for making a database stored upon a computer readable medium used with a computer for use as a computerized multi-lingual dictionary for translating words and phrases in a first language into words and phrases in at least a second language, comprising the steps:

(a) defining a set of abstract concept groups capable of encompassing all words and phrases to be translated of the first and second languages, each concept group containing words and phrases having related meanings and all of said words and phrases to be translated being included in at least one of the concept groups, such phrases comprising a string made up of words and punctuations, (b) providing a word-number mapper capable of inversely associating a unique first number between 0 and N-1 with each of the unique words or punctuations of the first language with N being the total number of unique words and punctuations in the first language, (c) mapping each unique word or punctuation to a unique first number using the mapper of step (b) and storing the resultant mapping, (d) separating one or more first numbers from one or more other first numbers with a second number, (e) forming a set of pairs of first and second numbers representative of each of the concept groups in said first language, (f) forming a translator file for said first language by combining the first and second number pairs of all the concept groups.

2. The method of claim 1, wherein the first numbers lie within a numeric range which excludes said second numbers.

3. The method of claim 2, wherein the smallest second number is offset from the smallest first number by a value substantially equal to the total number of words and punctuations in the first language.

4. The method of claim 2, wherein each of the second numbers represent bit-mapped sense vectors.

5. The method of claim 2, wherein the first and second numbers are encoded using a pseudo-Huffinan scheme.

6. The method of claim 5, wherein some of the numbers are encoded as 1-byte, and the remaining numbers are encoded as 2-bytes.

7. A method for making a database stored upon a computer readable medium used with a computer for use in a computerized multi-lingual dictionary for translating words and phrases in a first language into words and phrases in at least a second language, comprising the steps:

storing in the database each word and word separator in a phrase as one or more first numbers paired with a second number associated with a bit-mapped sense vector for easy matching with other bit-mapped sense vectors.

8. The method of claim 7, wherein the first and second numbers occupy different numeric intervals.

9. The method of claim 8, wherein the stored numbers are encoded using a pseudo-Huffman compression scheme.

10. A method of making a compressed translator file as part of a database stored upon a computer readable medium used with a computer for use as a computerized multi-lingual dictionary for translating words and phrases in a first language into words and phrases in at least a second language, comprising the steps:

(a) defining a set of abstract concept groups capable of encompassing all words and phrases to be translated of the first and second languages, each concept group containing words and phrases having related meanings and all of said words and phrases to be translated being included in at least one of the concept groups, such phrases comprising a string made up of words and punctuations, (b) establishing a collection of N unique tokens made up of each unique word or punctuation, (c) providing a word-number mapper capable of inversely associating a unique first number between 0 and (N-1) with each of the unique tokens, (d) mapping each unique token established in step (b) to a unique first number using the mapper of step (c) and storing the resultant mapping, (e) creating and storing a translation vector constituting a sequence of second numbers for each word or phrase that can be translated of the first language, each translation vector including those numbers representative of different senses in the same concept group that the word or phrase can express, the total T of said translation vectors that are unique across all the concept groups being substantially less than the total number of words and phrases, said translation vectors being constituted by fixed length bit vectors, (f) computing from each translation vector a unique translation vector indicator third number having a value between N and N+(T-1), (g) forming a temporary first file made up of a sequence of first numbers denoting words and punctuations and third numbers denoting the translation vector indicators, (h) computing the frequencies of the numbers in the temporary first file and encoding same with fourth numbers of different length such that shorter fourth numbers are used to encode higher frequency numbers in the temporary first file and longer fourth numbers are used to encode lower frequency numbers, (i) forming and storing a temporary second file made up of a sequence of the fourth numbers, (j) computing the length of each concept group represented by fourth numbers in the temporary second file, (k) storing the length of each concept group as a prefix to the sequence of fourth numbers representative of each concept group to form a final stored translator file made up solely of numbers and representing every word and phrase of the first language, (l) repeating steps (e)-(k) for each word and phrase of the second language.

11. A data structure stored on a computer readable medium accessed by an application program executed on a computer system, the data structure comprising string data having a plurality of data units, each of which can be accessed by a processor of a dictionary system; the data units representing separated words among a sequence of G concept groups of a first language, the concept groups corresponding to those of an abstract language also containing G concept groups such that each gth concept-group of the first language corresponds to a gth concept group of the abstract language; and said string data represent solely numbers.

12. The data structure of claim 11, wherein said data units also represent separated words among a sequence of G concept groups of a second language also corresponding to those of the abstract language.

13. The data structure of claim 11, wherein the data further represent bit-mapped sense vectors representing senses of words within a concept group.

14. The data structure of claim 11, wherein computer-readable program code represents the string data and wherein the computer readable program code representing the string data causes the application program of the computer system to form a translation file for use in translating between the first language and the abstract language.

15. A program product for making a database stored upon a computer readable medium used with a computer for use as a computerized multi-lingual dictionary for translating words and phrases in a first language into words and phrases in at least a second language, comprising:

(a) computer readable program code for causing a computer to define a set of abstract concept groups capable of encompassing all words and phrases to be translated of the first and second languages, each concept group containing words and phrases having related meanings and all of said words and phrases to be translated being included in at least one of the concept groups, such phrases comprising a string made up of words and punctuations, (b) computer readable program code for causing a computer to provide a word-number mapper capable of inversely associating a unique first number between 0 and N-1 with each of the unique words or punctuations of the first language with N being the total number of unique words and punctuations in the first language, (c) computer readable program code for causing a computer to map each unique word or punctuation to a unique first number using the computer readable program code for causing a computer to map of step (b) and storing the resultant mapping, (d) computer readable program code for causing a computer to separate one or more first numbers from one or more other first numbers with a second number, (e) computer readable program code for causing a computer to form a set of pairs of first and second numbers representative of each of the concept groups in said first language, and (f) computer readable program code for causing a computer to form a translator file for said first language by combining the first and second number pairs of all the concept groups.

16. The product of claim 15, wherein the first numbers lie within a numeric range which excludes said second numbers.

17. The product of claim 16, wherein the smallest second number is offset from the smallest first number by a value substantially equal to the total number of words and punctuations in the first language.

18. The product of claim 16, wherein the first and second numbers are encoded using a pseudo-Huffman scheme.

* * * * *